(12) United States Patent
Sullivan et al.

(10) Patent No.: US 10,413,783 B2
(45) Date of Patent: Sep. 17, 2019

(54) GOLF BALLS HAVING MULTI-LAYERED COVERS MADE FROM PLASTICIZED COMPOSITIONS CONTAINING NON-ACID POLYMERS

(71) Applicant: Acushnet Company, Fairhaven, MA (US)

(72) Inventors: Michael J. Sullivan, Old Lyme, CT (US); Robert Blink, Newport, RI (US); Mark L. Binette, Mattapoisett, MA (US); David A. Bulpett, Boston, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 16/040,739

(22) Filed: Jul. 20, 2018

(65) Prior Publication Data

US 2018/0326262 A1 Nov. 15, 2018

Related U.S. Application Data

(62) Division of application No. 14/873,392, filed on Oct. 2, 2015, now Pat. No. 10,029,152.

(51) Int. Cl.
| | | |
|---|---|---|
| *A63B 37/06* | (2006.01) |
| *A63B 37/00* | (2006.01) |
| *C08K 5/00* | (2006.01) |
| *C08L 23/00* | (2006.01) |
| *C08L 23/02* | (2006.01) |
| *C08K 5/101* | (2006.01) |

(52) U.S. Cl.
CPC ...... *A63B 37/0076* (2013.01); *A63B 37/0031* (2013.01); *A63B 37/0039* (2013.01); *A63B 37/0043* (2013.01); *A63B 37/0087* (2013.01); *A63B 37/0092* (2013.01); *C08K 5/0016* (2013.01); *C08K 5/101* (2013.01); *C08L 23/00* (2013.01); *C08L 23/02* (2013.01); *A63B 2037/0079* (2013.01)

(58) Field of Classification Search
CPC .................. A63B 37/0038; A63B 37/0039
USPC ....................................... 473/376
See application file for complete search history.

(56) References Cited

U.S. PATENT DOCUMENTS

| | | |
|---|---|---|
| 5,183,843 A | 2/1993 | Sakai et al. |
| 5,527,847 A | 6/1996 | Mumcu et al. |
| 5,683,817 A | 11/1997 | Kenmochi |
| 5,886,103 A | 3/1999 | Bellinger et al. |
| 5,981,654 A | 11/1999 | Rajagopalan |
| 6,001,930 A | 12/1999 | Rajagopalan |

(Continued)

*Primary Examiner* — Raeann Gorden
(74) *Attorney, Agent, or Firm* — Daniel W. Sullivan

(57) ABSTRACT

Multi-layered golf balls containing a three-layered cover assembly are provided. For example, a cover assembly having an inner cover, intermediate cover, and outer cover layer may be prepared. At least one of the cover layers is formed from a thermoplastic composition that preferably comprises: a) thermoplastic non-acid polymer, and b) plasticizer. A fatty acid ester such as ethyl oleate is preferably used as the plasticizer. Suitable non-acid polymers include, for example, polyesters, polyamides, polyolefins, and polyurethanes. The cover assembly has good impact durability and helps provide the ball with relatively high resiliency at given compressions.

8 Claims, 2 Drawing Sheets

(56) References Cited

U.S. PATENT DOCUMENTS

| | | | |
|---|---|---|---|
| 6,117,025 A * | 9/2000 | Sullivan | A63B 37/0003 473/373 |
| 6,187,864 B1 | 2/2001 | Rajagopalan | |
| 6,241,625 B1 | 6/2001 | Yokota et al. | |
| 6,376,037 B1 | 4/2002 | Montanari et al. | |
| 6,800,690 B2 | 10/2004 | Rajagopalan et al. | |
| 6,849,675 B2 | 2/2005 | Sullivan | |
| 6,872,774 B2 | 3/2005 | Sullivan et al. | |
| 7,053,142 B2 | 5/2006 | Sullivan | |
| 7,144,938 B1 | 12/2006 | Feinberg et al. | |
| 7,297,737 B2 | 11/2007 | Fish, Jr. et al. | |
| 2002/0151380 A1 | 10/2002 | Sullivan | |
| 2004/0235587 A1 | 11/2004 | Sullivan et al. | |
| 2005/0209026 A1 | 9/2005 | Higuchi et al. | |
| 2006/0172823 A1 | 8/2006 | Loper et al. | |
| 2007/0100085 A1 | 5/2007 | Kim et al. | |
| 2007/0149323 A1 | 6/2007 | Morgan et al. | |
| 2009/0170634 A1 * | 7/2009 | Loper | A63B 37/0003 473/373 |
| 2009/0203469 A1 * | 8/2009 | Sullivan | A63B 37/0049 473/374 |
| 2010/0167845 A1 | 7/2010 | Kim et al. | |
| 2011/0253277 A1 | 10/2011 | Mueller et al. | |
| 2012/0129631 A1 | 5/2012 | Sullivan et al. | |
| 2012/0129632 A1 | 5/2012 | Sullivan et al. | |

* cited by examiner

GOLF BALLS HAVING MULTI-LAYERED COVERS MADE FROM PLASTICIZED COMPOSITIONS CONTAINING NON-ACID POLYMERS

CROSS-REFERENCE TO RELATED APPLICATIONS

This application is a divisional of co-pending, co-assigned U.S. patent application Ser. No. 14/873,392 having a filing date of Oct. 2, 2015, now allowed, the disclosure of which is hereby incorporated by reference.

BACKGROUND OF THE INVENTION

Field of the Invention

The present invention relates generally to multi-piece golf balls having a solid core and multi-layered cover. In one embodiment, the multi-layered cover is a three-layered cover including an inner cover, intermediate cover, and outer cover layer. At least one of the cover layers is made from a thermoplastic composition preferably comprising a non-acid polymer and plasticizer. Suitable non-acid polymers include, for example, polyesters, polyamides, polyolefins, and polyurethanes. Preferably, the plasticized thermoplastic composition is used to form the intermediate or inner cover layer.

Brief Review of the Related Art

Multi-layered, solid golf balls are used today by recreational and professional golfers. In general, these golf balls contain an inner core protected by a cover. The core acts as the primary engine for the ball and the cover protects the core and helps provide the ball with durability and wear-resistance. The core and cover may be single or multi-layered. For example, three-piece golf balls having an inner core, inner cover layer, and outer cover layer are popular. In other instances, golfers will use a four-piece ball containing a dual-core (inner core and surrounding outer-core layer) and dual-cover (inner cover layer and surrounding outer cover layer). Intermediate layer(s) may be disposed between the core and cover layers to impart various properties. Thus, five-piece and even six-piece balls can be made.

Normally, the core layers are made of a natural or synthetic rubber material or an acid copolymer ionomer. These ionomer polymers are typically copolymers of ethylene and methacrylic acid or acrylic acid that are partially or fully-neutralized. Metal ions such as sodium, lithium, zinc, and magnesium are commonly used to neutralize the acid groups in the copolymer. The acid groups may be partially-neutralized (where typically, about 10 to 70% of the acid groups are neutralized) or highly-neutralized (where typically, greater than 70% of the acid groups are neutralized.) In addition to being used as a core material, these acid copolymer ionomers may be used to make intermediate and cover layers for the golf ball. Such ionomer resins generally have good durability and toughness. When used as a core material, the ionomer resin helps impart a higher initial velocity to the golf ball. When used as a cover material, the ionomer resin helps impart impact durability, wear-resistance, and cut/shear-resistance to the golf ball.

Many golf balls have multi-layered covers comprising an inner cover and surrounding outer cover layer. For example, the inner cover may be made of a relatively hard material such as the above-described ethylene acid copolymer ionomer resin. Meanwhile, the outer cover layer may be made of a relatively soft polyurethane or polyurethane composition. Also, three-layered covers, wherein the cover structure includes an inner cover, intermediate cover, and outer cover layer may be made. The patent literature describes numerous golf ball covers made from such ethylene acid copolymer ionomer compositions including, for example, U.S. Pat. Nos. 5,688,869; 6,150,470; 6,277,921; 6,433,094; 6,451,923; 6,573,335; and 6,800,695.

However, one disadvantageous feature of such ionomer cover balls is they tend to have a hard "feel." Some players experience a harsher, less comfortable feel when their club face makes contact with these hard balls. The player senses less control and the harder ball tends to have low initial spin. It is generally more difficult to hit hard balls with the proper touch and control. This can be particularly troublesome when making approach shots with irons near the green.

Thus, the industry has looked at numerous non-ionomeric materials such as polyolefins, polyamides, polyesters, polyurethanes, polyureas, fluoropolymers, polyvinyl chlorides, polycarbonates, polyethers, polyimides, and the like for making components and layers in golf balls. For example, Sullivan et al., U.S. Pat. No. 6,872,774 discloses a multi-layered golf ball having a core, intermediate layer, and cover. The intermediate layer is made of a composition comprising a non-ionomeric acid polymer and non-ionomeric stiffening polymer including blends of polyamides and polypropylene and polyethylene copolymers that have been grafted with maleic anhydride or sulfonate groups.

In Rajagopalan et al., U.S. Pat. No. 6,800,690 golf balls having at least one layer formed from a composition comprising a polyamide and non-ionomeric material including grafted or non-grafted metallocene-catalyzed olefinic polymers such as polyethylene and copolymers of ethylene are disclosed. The olefinic polymers may also contain functional groups such as epoxy, anhydride, amine, oxazoline, sulfonic acid, carboxylic acid, and their salts.

Kim et al, US Patent Application Publication US 2010/0167845 discloses golf balls having a core, at least one intermediate layer, and at least one cover layer prepared from blends of polyamides with functional polymer modifiers of the polyamide. The functional modifier of the polyamide can include $\alpha$-olefin copolymers or terpolymers having a glycidyl group, hydroxyl group, maleic anhydride group, or carboxylic group. The polyamide composition is preferably blended with a polyalkenamer rubber/functionalized organic modifier material.

In Loper et al., US Patent Application Publication 2006/0172823, four-piece golf balls having one or more core layers, an inner mantle layer, an outer mantle layer, and one or more cover layers are disclosed. In one embodiment, the composition of inner mantle layer and/or the outer mantle layer comprises a blend of polyamide or copolymeric polyamide and another polymer. According to the '823 Publication, suitable other polymers for the blend include ionomers, co-polyetheramide elastomers, polyarylates, polyolefins, polyoctenamers, polyurethanes, styrenic block copolymers, metallocene catalized polymers, and polyesters.

Although some non-ionomeric compositions as mentioned above may be somewhat effective for making certain components and layers in a golf ball, there is still a need for new compositions that can impart high quality performance properties to the ball. Particularly, there is a continuing need for improved cover constructions in golf balls. The cover material should have good impact durability, toughness, and cut/shear-resistance, while helping to provide the ball with high resiliency. The cover material, however, should not be excessively hard and stiff so that properties such as feel, softness, and spin control are sacrificed. The present invention provides golf balls having an optimum combination of properties.

SUMMARY OF THE INVENTION

The present invention generally relates to multi-layered golf balls and more particularly to golf balls having at least one layer made of thermoplastic non-acid polymer/plasticizer compositions. In one version, the ball comprises a core having at least one layer and a three-layered cover assembly including: a) an inner cover comprising a thermoplastic material, b) an intermediate cover disposed about the inner cover layer, and c) a surrounding outer cover. Preferably, the thermoplastic material comprises: i) a thermoplastic non-acid polymer and ii) a plasticizer. In one embodiment, the inner cover layer has a Shore D midpoint hardness in the range of about 15 to about 60 Shore D, and the outer cover layer has Shore D surface hardness in the range of about 45 to about 75 Shore D, wherein the hardness of the outer cover layer is greater than the hardness of the inner cover layer.

Various non-acid polymers may be used in the thermoplastic composition. For example, non-acid polymers selected from the group consisting of fluoropolymers, polystyrenes, polyolefins, polyamides, polyesters, polyethers, polyurethanes, polyureas, polyvinyl chlorides, polyvinyl acetates, polyimides, ethylene propylene rubber, ethylene propylene diene rubber, styrenic block copolymer rubbers, alkyl acrylate rubbers, and mixtures thereof may be used. In one preferred version, a polyamide selected from the group consisting of polyamide 6; polyamide 6,6; polyamide 6,10; polyamide 6,12; polyamide 11; polyamide 12; polyamide 6,9; and polyamide 4,6, and copolymers and blends thereof is used. In another version, the non-acid polymer is selected from the group consisting of a polyether-amide block copolymer and a polyester-polyether block copolymer, and mixtures thereof. Various plasticizers may be used in the thermoplastic composition. In one particularly preferred version, the thermoplastic composition comprises a fatty acid ester, particularly an alkyl oleate, and more particularly ethyl oleate. Preferably, the thermoplastic composition comprises about 3 to about 50% by weight plasticizer, more preferably about 8 to about 42%, and even more preferably about 10 to about 30%, plasticizer based on weight of composition. Various materials may be used to form the intermediate and outer cover layers. In one preferred embodiment, the intermediate cover layer comprises a second thermoplastic material and the outer cover layer comprises a third thermoplastic material. Acid copolymer ionomers and polyurethanes/polyureas may be used as the second and third thermoplastic cover layers.

In a second embodiment, the ball comprises a core having at least one layer and a three-layered cover assembly including an inner cover; an intermediate cover layer comprising a thermoplastic composition, preferably comprising: i) a thermoplastic non-acid polymer and ii) a plasticizer; and a surrounding outer cover layer. The inner cover layer preferably has a Shore D midpoint hardness in the range of about 15 to about 75 Shore D, and the outer cover layer has Shore D surface hardness in the range of about 45 to about 75 Shore D, wherein the hardness of the outer cover layer is greater than the hardness of the inner cover.

In a third embodiment, the ball comprises a core having at least one layer and a three-layered cover assembly including an inner cover; an intermediate cover layer disposed about the inner cover; and an outer cover layer comprising a thermoplastic composition, preferably comprising: i) a thermoplastic non-acid polymer and ii) a plasticizer. The inner and intermediate cover layers preferably each have a hardness greater than the hardness of the outer cover layer.

The thermoplastic non-acid polymer/plasticizer compositions of this invention may be used to form one or more core, intermediate, or cover layers. These compositions have a good combination of properties including Coefficient of Restitution (CoR) and compression so they can be used to make various golf ball layers. For example, a molded sphere comprising the thermoplastic composition of this invention having a Coefficient of Restitution of at least about 0.750, preferably at least about 0.800; and a Shore C surface hardness of about 10 to about 75, preferably about 20 to about 60 can be made. In one embodiment, balls having a relatively low compression, for example, in the range of about 25 to about 75, may be made.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Figure 1:
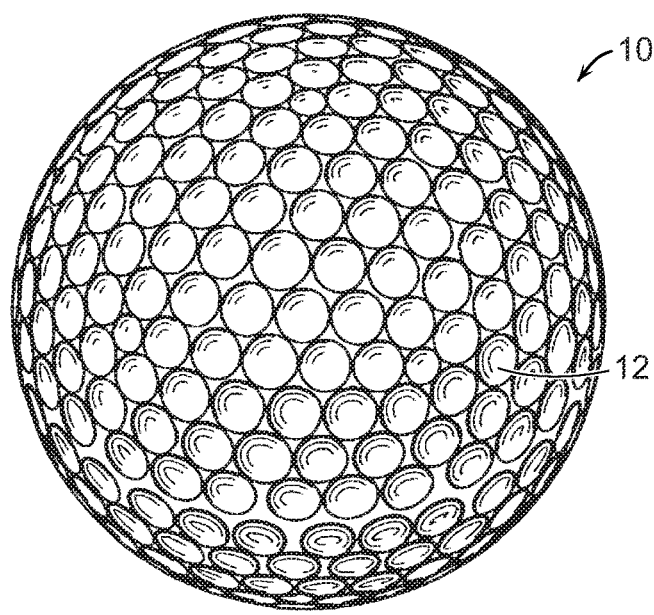
FIG. 1 is a perspective view of a dimpled golf ball made in accordance with the present invention.

Golf balls having various constructions may be made in accordance with this invention. For example, golf balls having one-piece, two-piece, three-piece, four-piece, and five or more-piece constructions with the term "piece" referring to any core, cover or intermediate layer of a golf ball construction. Representative illustrations of such golf ball constructions are provided and discussed further below. The term, "layer" as used herein means generally any spherical portion of the golf ball. More particularly, in one version, a one-piece ball is made using the inventive composition as the entire golf ball excluding any paint or coating and indicia applied thereon. In a second version, a two-piece ball comprising a single core and a single cover layer is made. In a third version, a three-piece golf ball containing a dual-layered core and single-layered cover is made. The dual-core includes an inner core (center) and surrounding outer core layer. In another version, a three-piece ball containing a single core layer and two cover layers is made. In yet another version, a four-piece golf ball containing a dual-core and dual-cover (inner cover and outer cover layers) is made. In yet another construction, a four-piece golf ball containing a core; an inner cover layer, an intermediate cover layer, and an outer cover layer, may be made. In still another construction, a five-piece ball is made containing an a dual-core, an inner cover layer, an intermediate cover layer, and an outer cover layer. The diameter and thickness of the different layers along with properties such as hardness and compression may vary depending upon the construction and desired playing performance properties of the golf ball.

Any one or more of the layers of any of the one, two, three, four, or five, or more-piece (layered) balls described above may comprise a plasticized thermoplastic composition as disclosed herein. That is, any of the inner (center) core and/or outer core layers, and/or inner, intermediate, or outer cover layers may comprise a plasticized composition of this invention.

Also, when more than one thermoplastic layer is used in the golf ball, the thermoplastic composition in the respective layers may be the same or different, and the composition may have the same or different hardness values. For example, a three-layered cover assembly may be made, wherein the inner cover comprises a first thermoplastic composition, the intermediate cover layer comprises a second thermoplastic composition, and the outer cover layer comprises a third thermoplastic composition. The first, second, and third compositions may be the same, or the respective compositions may be different. For instance, the plasticized thermoplastic of this invention may be used in one, two, or three cover layers. Preferably, the plasticized thermoplastic composition of this invention is used to form at least one cover layer. Likewise, when more than one thermoset layer is used in the golf ball, the thermoset composition in the respective layers may be the same or different, and the composition may have the same or different hardness values. Furthermore, in some examples, the thermoplastic material in a particular thermoplastic layer may constitute two, three, or more "sub-layers" of the same or different thermoplastic composition. That is, each thermoplastic layer can be formed from one or more sub-layers of the same or different thermoplastic material. In such instances, the thermoplastic layer can be considered a composite layer made of multiple independent and distinct component layers. Preferably, at least one of the component layers comprises the plasticized thermoplastic composition of this invention.

Non-Acid Polymers

Non-acid polymer compositions (NAPS), which are plasticized per this invention, may be used to form any layer in the golf ball constructions of this invention. The term, "non-acid polymer," as used herein, means a polymer which is not an "acid polymer"—in general, by the term, "acid polymer", it is meant a polymer containing free carboxylic acid groups that is formed from free carboxylic acid-containing monomers. The term, "polymer" is used generically herein to refer to a large molecule (macromolecule) having repeating structural units typically connected by covalent bonds and includes, but is not limited to, oligomers, homopolymers, copolymers, and mixtures thereof. The term, "copolymer," as used herein, includes polymers formed from two, three, or more different types of monomers. It is understood the non-acid polymer compositions of this invention may contain a blend of two or more non-acid polymers.

Suitable non-acid polymers that may be used to form the compositions of this invention include, but are not limited to, the following: a) polyesters and particularly plasticized polyester compositions such as those described in co-pending, co-assigned U.S. patent application Ser. No. 14/532,141, the disclosure of which is hereby incorporated by reference; b) polyamides, and particularly plasticized polyamide compositions such as those described in co-pending, co-assigned U.S. patent application Ser. No. 14/309,066 (Publication US 2014/0302947), Ser. No. 14/330,189 (Publication US 2014/0323243), and Ser. No. 14/563,646, the disclosures of which are hereby incorporated by reference; and c) polyurethanes, polyureas, and polyurethane-polyurea hybrids and particularly plasticized polyurethane compositions such as those described in in co-pending, co-assigned U.S. patent application Ser. No. 14/672,485, the disclosure of which is hereby incorporated by reference.

Other examples of non-acid polymers include fluoropolymers; metallocene-catalyzed polymers; polystyrenes, acrylonitrile-butadiene-styrene, poly(styrene sulfonate), polyethylene styrene: polyolefins such as polypropylenes and polyethylenes, and particularly grafted polypropylenes and grafted polyethylenes that are modified with a functional group, such as maleic anhydride of sulfonate; polyvinyl chlorides and grafted polyvinyl chlorides; polyvinyl acetates; polycarbonates; polyethers, such as polyarylene ethers, polyphenylene oxides; polyimides; polyetherketones; and polyamideimides. In particular, the non-acid polymer was not polymerized from any of the following monomers containing free carboxylic acid groups: acrylic acid, methacrylic acid, ethacrylic acid, maleic acid, crotonic acid, fumaric acid, and itaconic acid.

Examples of particularly suitable commercially available non-acid polymers include, but are not limited to, Lotader® ethylene-alkyl acrylate polymers and Lotryl® ethylene-alkyl acrylate polymers, and particularly Lotader® 4210, 4603, 4700, 4720, 6200, 8200, and AX8900 commercially available from Arkema Corporation; Elvaloy® AC ethylene-alkyl acrylate polymers, and particularly AC 1224, AC 1335, AC 2116, AC3117, AC3427, and AC34035, commercially available from E. I. du Pont de Nemours and Company; Fusabond® elastomeric polymers, such as ethylene vinyl acetates, polyethylenes, metallocene-catalyzed polyethylenes, ethylene propylene rubbers, and polypropylenes, and particularly Fusabond® N525, C190, C250, A560, N416, N493, N614, P614, M603, E100, E158, E226, E265, E528, and E589, commercially available from E. I. du Pont de Nemours and Company; Honeywell A-C polyethylenes and oxidized polyethylenes such as A-C 655, and A-C 395, commercially available from Honeywell; Nordel® IP rubber, Elite® polyethylenes, Engage® elastomers, and Amplify® functional polymers, and particularly Amplify® GR 207, GR 208, GR 209, GR 213, GR 216, GR 320, GR 380, and EA 100, commercially available from The Dow Chemical Company; Enable® metallocene polyethylenes, Exact® plastomers, Vistamaxx® propylene-based elastomers, and Vistalon® EPDM rubber, commercially available from ExxonMobil Chemical Company; Starflex® metallocene linear low density polyethylene, commercially available from LyondellBasell; Elvaloy® HP4051, HP441, HP661 and HP662 ethylene-butyl acrylate-carbon monoxide polymers and Elvaloy® 741, 742 and 4924 ethylene-vinyl acetate-carbon monoxide polymers, commercially available from E. I. du Pont de Nemours and Company; Evatane® ethylene-vinyl acetate polymers having a vinyl acetate content of from 18 to 42%, commercially available from Arkema Corporation; Elvax® ethylene-vinyl acetate polymers having a vinyl acetate content of from 7.5 to 40%, commercially available from E. I. du Pont de Nemours and Company; Vamac® G terpolymer of ethylene, methylacrylate and a cure site monomer, commercially available from E. I. du Pont de Nemours and Company; Vistalon® EPDM rubbers, commercially available from ExxonMobil Chemical Company; Kraton® styrenic block copolymers, and particularly Kraton® FG1901GT, FG1924GT, and RP6670GT, commercially available from Kraton Performance Polymers Inc.; Septon® styrenic block copolymers, commercially available from Kuraray Co., Ltd.; Hytrel® polyester elastomers, and particularly Hytrel® 3078, 4069, and 5556, commercially available from E. I. du Pont de Nemours and Company; Riteflex® polyester elastomers, commercially available from Celanese Corporation; Pebax® thermoplastic polyether block amides, and particularly Pebax® 2533, 3533, 4033, and 5533, commercially available from Arkema Inc.; Affinity® and Affinity® GA elastomers, Versify® ethylene-propylene copolymer elastomers, and Infuse® olefin block copolymers, commercially available from The Dow Chemical Company; Exxelor® polymer resins, and particularly Exxelor® PE 1040, PO 1015, PO 1020, VA 1202, VA 1801, VA 1803, and VA 1840, commercially available from ExxonMobil Chemical Company; and Royaltuf® EPDM, and particularly Royaltuf®498 maleic anhydride modified polyolefin based on an amorphous EPDM and Royaltuf®485 maleic anhydride modified polyolefin based on an semi-crystalline EPDM, commercially available from Chemtura Corporation.

In particular, the non-acid polymer may be a non-acid elastomeric polymer such as, for example, ethylene-alkyl acrylate polymers, particularly polyethylene-butyl acrylate, polyethylene-methyl acrylate, and polyethylene-ethyl acrylate; metallocene-catalyzed polymers; ethylene-butyl acrylate-carbon monoxide polymers and ethylene-vinyl acetate-carbon monoxide polymers; polyethylene-vinyl acetates; ethylene-alkyl acrylate polymers containing a cure site monomer; ethylene-propylene rubbers and ethylene-propylene-diene monomer rubbers; olefinic ethylene elastomers, particularly ethylene-octene polymers, ethylene-butene polymers, ethylene-propylene polymers, and ethylene-hexene polymers; styrenic block copolymers; polyester and polyamide elastomers; polyolefin rubbers, particularly polybutadiene, polyisoprene, and styrene-butadiene rubber; and thermoplastic polyurethanes.

Additional examples of non-acid polymers that may be used to make the compositions of this invention include, for example, natural and synthetic rubbers, including, but not limited to, ethylene propylene rubber ("EPR"), ethylene propylene diene rubber ("EPDM"), styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber (such as ethylene-alkyl acrylates and ethylene-alkyl methacrylates, and, more specifically, ethylene-ethyl acrylate, ethylene-methyl acrylate, and ethylene-butyl acrylate), chlorinated isoprene rubber, acrylonitrile chlorinated isoprene rubber, and polybutadiene rubber (cis and trans).

The non-acid polymers of this invention stand in contrast to acid polymers and ionomers that are often used in golf ball constructions and are typically copolymers of an α-olefin and a $C_3$-$C_8$ α,β-ethylenically unsaturated carboxylic acid with an optional softening monomer. These acid copolymers are normally reacted with a sufficient amount of cation source such that at least 70% and more typically at least 90% of all acid groups present are neutralized to form the ionomer.

Normally, an ionomer is made by polymerizing a monomer containing a free carboxylic acid group and α-olefin; and neutralizing at least some of the acid groups with a metal cation. For example, ethylene and methacrylic acid first may be reacted to form the acid polymer as shown in the following diagram:

Production of Acid Polymer

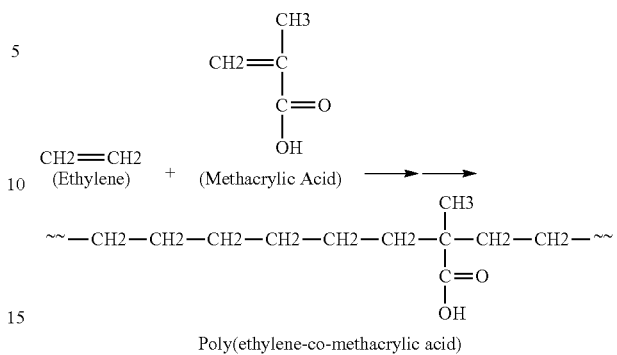

Then, the ionomer may be formed through neutralization by reacting the acid polymer with a cation source (for example, a sodium or zinc cation source). For example, the acid polymer may be reacted with NaOH or $ZnCO_3$. In one example, the resulting polymer is a sodium salt as shown in the following diagram:

Production of Ionomer

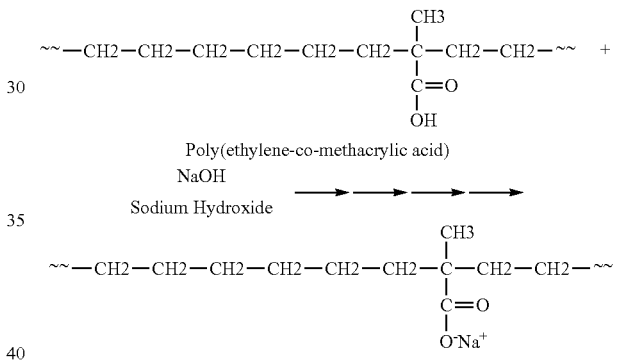

As described above, the non-acid polymers of this invention differ significantly from the above-described acid polymers and corresponding ionomers that are formed from such acid polymers, because the non-acid polymers of this invention are not formed from free carboxylic acid-containing monomers and these polymers do not contain free carboxylic acid groups.

Plasticizers for Making Thermoplastic Compositions

As discussed above, the non-acid polymer compositions of this invention contain a plasticizer. Adding the plasticizers helps to reduce the glass transition temperature (Tg) of the composition. The glass transition in a polymer is a temperature range below which a polymer is relatively brittle and above which it is rubber-like. In addition to lowering the Tg, the plasticizer may also reduce the tanδ in the temperature range above the Tg. The Tg of a polymer is measured by a Differential Scanning calorimeter or a Dynamic Mechanical Analyzer (DMA) and the DMA is used to measure tanδ. The plasticizer may also reduce the hardness and compression of the composition when compared to its non-plasticized condition. The effects of adding a plasticizer to the non-acid polymer composition on Tg, flex modulus, hardness, and other physical properties are discussed further below.

The non-acid polymer composition may contain one or more plasticizers. The plasticizers that may be used in the non-acid polymer compositions of this invention include, for example, N-butylbenzenesulfonamide (BBSA); N-ethylbenzenesulfonamide (EBSA); N-propylbenzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate; and blends thereof.

In one preferred version, the plasticizer is selected from the group of polytetramethylene ether glycol (available from BASF under the tradename, PolyTHF™ 250); propylene carbonate (available from Huntsman Corp., under the tradename, Jeffsol™ PC); and/or dipropyleneglycol dibenzoate (available from Eastman Chemical under the tradename, Benzoflex™ 284). Mixtures of these plasticizers also may be used.

Other suitable plasticizer compounds include benzene mono-, di-, and tricarboxylic acid esters. Phthalates such as Bis(2-ethylhexyl) phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate, and blends thereof are suitable. Iso- and terephthalates such as Dioctyl terephthalate and Dinonyl isophthalate may be used. Also appropriate are trimellitates such as Trimethyl trimellitate (TMTM),Tri-(2-ethylhexyl) trimellitate (TOTM),Tri-(n-octyl,n-decyl) trimellitate, Tri-(heptyl,nonyl) trimellitate, Tri-n-octyl trimellitate; as well as benzoates, including: 2-ethylhexyl-4-hydroxy benzoate, n-octyl benzoate, methyl benzoate, and ethyl benzoate, and blends thereof.

Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS), and blends thereof. Also, esters based on glycols, polyglycols and polyhydric alcohols such as poly(ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate, and blends thereof may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate. Mixtures of any of the plasticizers described herein also may be used in accordance with this invention. In a particularly preferred version, the fatty acid ester is an alkyl oleate selected from the group consisting of methyl, propyl, ethyl, butyl, octyl, and decyl oleates. For example, in one version, ethyl oleate is used as the plasticizer. In another version, butyl oleate or octyl oleate is used in the composition. Suitable commercially-available fatty acids include, for example, SylFat™ FA2 Tall Fatty Acid, available from Arizona Chemical. The fatty acid composition includes 2% saturated, 50% oleic, 37% linoleic (non-conjugated), and 7% linoleic (conjugated) fatty acids; and 4% other fatty acids. This fatty acid typically has an acid value in the range of 195 to 205 mg KOH/gm.

Glycerol-based esters such as soy-bean, tung, or linseed oils or their epoxidized derivatives or blends thereof can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable. Glycerol mono-, di-, and tri-oleates may be used per this invention, and in one preferred embodiment, glycerol trioleate is used as the plasticizer.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as tricresyl phosphate (TCP), tributyl phosphate(TBP), octyldiphenyl phosphate, alkyl sulfonic acid phenyl esters (ASE); and blends thereof; and sulfonamides such as N-ethyl toluene sulfonamide,N-(2-hydroxypropyl) benzene sulfonamide, N-(n-butyl) benzene sulfonamide. Furthermore, thioester and thioether variants of the plasticizer compounds mentioned above are suitable.

Non-ester plasticizers such as alcohols, polyhydric alcohols, glycols, polyglycols, and polyethers also are suitable materials for plasticization. Materials such as polytetramethylene ether glycol, poly(ethylene glycol), and poly(propylene glycol), oleyl alchohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of plasticizers that may be used in the ethylene acid copolymer composition of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

Jacques et al., U.S. Pat. No. 7,045,185, the disclosure of which is hereby incorporated by reference, discloses sulphonamides such as N-butylbenzenesulphonamide, ethyltoluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers also may be used.

Sulfonamides also may be used in the present invention, and these materials are described in Fish, Jr. et al., U.S. Pat. No. 7,297,737, the disclosure of which is hereby incorporated by reference. Examples of such sulfonamides include N-alkyl benzenesulfonamides and toluenesufonamides, particularly N-butylbenzenesulfonamide, N-(2-hydroxypropyl) benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., US Patent Application Publication 2010/0183837, the disclosure of which is hereby incorporated by reference.

As noted above, the fatty acid esters are particularly preferred plasticizers in the present invention. It has been found that the fatty acid esters perform well as plasticizers in the non-acid polymer composition. The fatty acid esters have several advantageous properties. For example, the fatty acid esters are compatible with the non-acid polymers and they tend to blend uniformly and completely with the non-acid polymer. Also, the fatty acid esters tend to improve the resiliency and/or compression of the composition as discussed further below. The non-acid polymer/plasticizer compositions may contain other ingredients that do not materially affect the basic and novel characteristics of the composition. For example, mineral fillers may be added as discussed above. In one particular version, the composition consists essentially of non-acid polymer and plasticizer, particularly a fatty acid ester. In another particular version, the composition consists solely of non-acid polymer and plasticizer, particularly a fatty acid ester.

One method of preparing the fatty acid ester involves reacting the fatty acid or mixture of fatty acids with a corresponding alcohol. Any alcohol can be used including, but not limited to, linear, branched, and cyclic alcohols. The fatty acid ester is commonly a methyl, ethyl, propyl, butyl, octyl, or other alkyl ester of a carboxylic acid that contains from 4 to 30 carbon atoms. In the present invention, ethyl, butyl, octyl, and decyl esters and particularly ethyl oleate, butyl oleate, and octyl oleate are preferred fatty acid esters because of their properties. The carboxylic acid may be saturated or unsaturated. Examples of suitable saturated carboxylic acids, that is, carboxylic acids in which the carbon atoms of the alkyl chain are connected by single bonds, include but are not limited to butyric acid (chain length of $C_4$ and molecular weight of 88.1); capric acid ($C_{10}$ and MW of 172.3); lauric acid ($C_{12}$ and MW of 200.3); myristic acid ($C_{14}$ and MW of 228.4); palmitic acid ($C_{16}$ and MW of 256.4); stearic acid ($C_{18}$ and MW of 284.5); and behenic acid ($C_{22}$ and MW of 340.6). Examples of suitable unsaturated carboxylic acids, that is, a carboxylic acid in which there is one or more double bonds between the carbon atoms in the alkyl chain, include but are not limited to oleic acid (chain length and unsaturation C18:1; and MW of 282.5); linoleic acid (C18:2 and MW of 280.5; linolenic acid (C18:3 and MW of 278.4); and erucic acid (C22:1 and MW of 338.6).

It is believed the plasticizer should be added in a sufficient amount to the non-acid polymer composition so there is a substantial change in the stiffness and/or hardness of the non-acid polymer. Thus, although the concentration of plasticizer may be as little as 1% by weight to form some non-acid polymer compositions per this invention, it is preferred that the concentration be relatively greater. For example, it is preferred that the concentration of the plasticizer be at least 3 weight percent (wt. %). More particularly, it is preferred that the plasticizer be present in an amount within a range having a lower limit of 1% or 3% or 5% or 7% or 8% or 10% or 12% or 15% or 18% and an upper limit of 20% or 22% or 25% or 30% or 35% or 40% or 42% or 50% or 55% or 60% or 66% or 71% or 75% or 80%. In one preferred embodiment, the concentration of plasticizer falls within the range of about 7% to about 75%, preferably about 9% to about 55%, and more preferably about 15% to about 50%.

The plasticized compositions of the present invention, in the neat (i.e., unfilled) form, preferably have a specific gravity of 0.90 g/cc to 1.00 g/cc, more preferably 0.95 g/cc to 0.99 g/cc. Any suitable filler, flake, fiber, particle, or the like, of an organic or inorganic material may be added to the HNP composition to increase or decrease the specific gravity, particularly to adjust the weight distribution within the golf ball, as further disclosed in U.S. Pat. Nos. 6,494,795, 6,547,677, 6,743,123, 7,074,137, and 6,688,991, the entire disclosures of which are hereby incorporated herein by reference. The term, "specific gravity" as used herein, has its ordinary and customary meaning, that is, the ratio of the density of a substance to the density of water at 4° C., and the density of water at this temperature is 1 $g/cm^3$.

The plasticized compositions of the present invention optionally include additive(s) and/or filler(s) in an amount within a range having a lower limit of 0 or 5 or 10 wt %, and an upper limit of 15 or 20 or 25 or 30 or 50 wt %, based on the total weight of the composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, rubber core regrind (recycled material), and mixtures thereof.

The plasticized compositions of the present invention are not limited by any particular method or any particular equipment for making the compositions. In a preferred embodiment, the composition is prepared by the following process. The non-acid polymer(s) and plasticizers, and optional additives/fillers are simultaneously or individually fed into a melt extruder, such as a single or twin screw extruder. Other suitable methods for incorporating the plasticizer into the composition are described further below. The components are intensively mixed prior to being extruded as a strand from the die-head. Additional methods for incorporating plasticizer into the thermoplastic compositions herein are disclosed in co-pending, co-assigned U.S. patent application Ser. No. 13/929,841, as well as in U.S. Pat. Nos. 8,523,708 and 8,523,709, which are fully incorporated by reference herein.

It is believed that adding the plasticizer to the non-acid polymer helps make the composition softer and more rubbery. Adding the plasticizers to the composition helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures. Thus, in one embodiment, the first non-acid copolymer (containing non-acid polymer only) composition has a first flex modulus value and the second non-acid polymer (containing non-acid polymer and plasticizer) composition has a second flex modulus value, wherein the second flex modulus value is at least 1% less; or at least 2% less; or at least 4% less; or at least 8% less; or at least 10% less than the first modulus value.

More particularly, in one embodiment, the non-acid polymer/plasticizer composition has a flex modulus lower limit of about 500 (or less), 1,000, 1,600, 2,000, 4,200, 7,500, 9,000, 10,000 or 20,000 or 40,000 or 50,000 or 60,000 or 70,000 or 80,000 or 90,000 or 100,000; and a flex modulus upper limit of about 110,000 or 120,000 or 130,000 psi or 140,000 or 160,000 or 180,000 or 200,000 or 300,000 or greater. In general, the properties of flex modulus and hardness are related, whereby flex modulus measures the material's resistance to bending, and hardness measures the material's resistance to indentation. In general, as the flex modulus of the material increases, the hardness of the material also increases. As discussed above, adding the plasticizer to the non-acid polymer helps reduce the flex modulus of the composition and it also helps reduce hardness to a certain degree. Thus, in one embodiment, the non-acid copolymer/plasticizer composition is relatively soft and having a hardness of no greater than 40 Shore D or no greater than 55 Shore C. For example, the Shore D hardness may be within a range having a lower limit of 5 or 8 or 10 or 12 or 14 and an upper limit of 28 or 30 or 32 or 34 or 35 or 38 or 40 Shore D. The Shore C hardness may be within the range having a lower limit of 10 or 13 or 15 or 17 or 19 and an upper limit of 44 or 46 or 48 or 50 or 53 or 55 Shore C. In other embodiments, the non-acid polymer/plasticizer composition is moderately soft having a hardness of no greater than about 60 Shore D or no greater than 75 Shore C. For example, the Shore D hardness may be within a range having a lower limit of 25, 28, 20, 32, 35, 36, 38, or 40, and an upper limit of 42, 45, 48, 50, 54, 56, or 60. The Shore C hardness may be within the range of having a lower limit of 30, 33, 35, 37, 39, 41, or 43, and an upper limit of 62, 64, 66, 68, 71, 73 or 75 Shore C. In yet other embodiments, the non-acid polymer/plasticizer composition is moderately hard having a hardness no greater than 95 Shore D or no greater than 99 C. For example, the Shore D hardness may be within the range having a lower limit of about 42, 44, 47, 51, 53, or 58 and an upper limit of about 60, 65, 72, 77, 80, 84, 91, or 95 Shore D. The Shore C hardness may be within the range having a lower limit of 57, 59, 62, 66, or 72 and an upper limit of about 75, 78, 84, 87, 90, 93, 95, 97, or 99 Shore C.

It also is believed that adding the plasticizer to the non-acid polymer composition helps reduce the glass transition temperature (Tg) of the composition in many instances. Thus, in one embodiment, the first non-acid polymer (containing non-acid polymer only) composition has a first Tg value and the second non-acid polymer (containing non-acid polymer and plasticizer) composition has a second Tg value, wherein the second Tg value is at least 1 degree (1°) less; or at least 2° less; or at least 4° less; or at least 8°; or at least 10° less than the first Tg value. In other embodiments, the first Tg value and the second Tg value are approximately the same.

In addition, introducing the specific plasticizers of this invention into the non-acid polymer composition generally helps to reduce the compression and/or increase the COR of the composition (when molded into a solid sphere and tested) versus a non-plasticized composition (when molded into a solid sphere and tested.) Plasticized non-acid polymer compositions typically show compression values lower, or at most equal to, non-plasticized compositions while the plasticized compositions display COR values that may be higher, or at the least equal to, non-plasticized compositions. This effect is surprising, because in many conventional compositions, the COR of the composition increases as the compression increases. In some instances plasticization of the composition might produce a slight reduction in the COR while at the same time reducing the compression to a greater extent, thereby providing an overall improvement to the compression/COR relationship over the non-plasticized composition.

Thus, the samples made from plasticized compositions of this invention may show a greater absolute resiliency than samples made from conventional materials at a given compression. Having this relatively high resiliency is an advantageous feature. In general, a core with higher resiliency will reach a higher velocity when struck by a golf club and travel longer distances. The "feel" of the ball also is important and this generally refers to the sensation that a player experiences when striking the ball with the club. The feel of a ball is a difficult property to quantify. Most players prefer balls having a soft feel, because the player experience a more natural and comfortable sensation when their club face makes contact with these balls. The feel of the ball primarily depends upon the hardness and compression of the ball.

Cover Structure

As noted above, the golf ball assembly generally comprises a core that is enclosed with a protective cover. The ball may contain one or more cover layers. For example, a golf ball having a single-layered cover may be made. In another version, a golf ball having a two-layered cover including inner and outer cover layers may be made. In yet another version, a three-layered cover including inner, intermediate, and outer cover layers may be made. The cover layers of this invention provide the ball with a variety of advantageous mechanical and playing-performance properties as discussed further below. In general, the hardness and thickness of the different cover layers may vary depending upon the desired ball construction. In addition, as discussed above, an intermediate layer may be disposed between the core and cover layers. The cover layers preferably have good impact durability, toughness, and wear-resistance. The non-acid polymer/plasticizer composition of this invention is used to form at least one of the cover layers.

In one preferred version, the golf ball includes a multi-layered cover comprising inner, intermediate, and outer cover layers, wherein at least one of the layers is formed of the non-acid polymer/plasticizer composition of this invention. Different ball constructions using different combinations of the non-acid polymer/plasticizer materials may be made in accordance with this invention. For example, these plasticized thermoplastic compositions may be used to construct cover assemblies having three layers as described in the following Table I.

TABLE I

Examples of Three-Layered Cover Assemblies

| Inner Cover | Intermediate Core Layer | Outer Core Layer |
|---|---|---|
| Plasticized Thermoplastic Non-Acid Polymer Material | Second Thermoplastic Material | Third Thermoplastic Material |
| Second Thermoplastic Material | Plasticized Thermoplastic Non-Acid Polymer Material | Third Thermoplastic Material |
| Plasticized Thermoplastic Non-Acid Polymer Material | Plasticized Thermoplastic Non-Acid Polymer Material | Second Thermoplastic Material |
| Second Thermoplastic Material | Third Thermoplastic Material | Plasticized Thermoplastic Non-Acid Polymer Material |
| Plasticized Thermoplastic Non-Acid Polymer Material | Second Thermoplastic Material | Plasticized Thermoplastic Non-Acid Polymer Material |
| Second Thermoplastic Material | Plasticized Thermoplastic Non-Acid Polymer Material | Plasticized Thermoplastic Non-Acid Polymer Material |
| Plasticized Thermoplastic Non-Acid Polymer Material | Plasticized Thermoplastic Non-Acid Polymer Material | Plasticized Thermoplastic Non-Acid Polymer Material |

In the above examples, "second and third thermoplastic materials" are used to form one or more of the cover layers. These other thermoplastic materials may be non-acid or acid polymers. Also, the formulations of the second and third thermoplastic materials may be the same or different, and these formulations may have the same or different hardness values. It should be understood that the above-described cover assemblies are only representative examples and are not meant to limit the invention. Other materials may be used to form the cover layers. For example, thermoset materials, as described below, may be used to form any of the cover layers. Likewise, when more than one thermoset layer is used in the golf ball, the thermoset composition in the respective layers may be the same or different, and the composition may have the same or different hardness values. In particularly preferred versions, the inner and/or intermediate cover layer is formed from the plasticized thermoplastic composition of this invention, and the outer cover layer is formed from a suitable thermoset or thermoplastic composition.

Suitable "second and third thermoplastic materials" that can be used to form the cover layers include, but are not limited to, polyurethanes; polyureas; copolymers, blends and hybrids of polyurethane and polyurea; olefin-based copolymer ionomer resins (for example, Surlyn® ionomer resins and DuPont HPF® 1000, HPF® 2000, and HPF® 1035; and HPF® AD 1172, commercially available from DuPont; Iotek® ionomers, commercially available from ExxonMobil Chemical Company; Amplify® 10 ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable. When used as the outer cover layer material, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In such instances, where the plasticized thermoplastic composition of this invention is used to form one or more cover layers, a composition comprising an ionomer or a blend of ionomers can be used to form the other cover layer(s). Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferably, 0 is α-olefin, X is a $C_3$-$C_8$ α,β-ethylenically unsaturated carboxylic acid present in an amount of 1 to 20 wt. %, based on total weight of the copolymer, and Y is an acrylate selected from alkyl acrylates and aryl acrylates present in an amount of 0 to 50 wt. %, based on total weight of the copolymer, wherein greater than 70% of the acid groups present in the composition are neutralized with a metal ion.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/ (meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/ or acrylate. The acid polymer is preferably neutralized to 70% or higher, including up to 100%, with a suitable cation source, such as metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. These highly-neutralized ionomers may be referred to as highly-neutralized polymers (HNPs). However, it is understood that other acid copolymer compositions may be used in accordance with the present invention. For example, acid copolymer compositions having acid groups that are neutralized from about 20% to about less than 70% may be used, and these materials may be referred to as partially-neutralized ionomers. For example, the partially-neutralized ionomers may have a neutralization level of about 30% to about 65%, and more particularly about 35% to 60%.

These acid copolymer ionomers help impart some hardness to the ball, and may be used in any cover layer, particularly inner and intermediate cover layers. For example, a cover layer may be formed from a composition comprising ethylene acid copolymer ionomers such as Surlyns® and Nucrels®, available from DuPont. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677, 401, the entire disclosures of which are hereby incorporated herein by reference.

The cover layers also may be formed from a composition comprising a 50/45/5 blend of Surlyn® 8940/Surlyn® 9650/ Nucrel® 960, and, in a particularly preferred embodiment, the composition has a material hardness of from 80 to 85 Shore C. In yet another version, the cover layer is formed from a composition comprising a 50/25/25 blend of Surlyn® 8940/Surlyn® 9650/Surlyn® 9910, preferably having a material hardness of about 90 Shore C. The cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions.

Nucrel® 960 is an E/MAA copolymer resin nominally made with 15 wt % methacrylic acid. Nucrel® 9-1 (a copolymer of ethylene with 23.5% n-butyl acrylate, and about 9% methacrylic acid that is unneutralized); Nucrel® 2940 (a copolymer of ethylene and about 19% methacrylic acid that is unneutralized); Nucrel® 0403 (a copolymer of ethylene and about 4% methacrylic acid that is unneutralized); and Nucrel® 960 (a copolymer of ethylene and about 15% methacrylic acid that is unneutralized) also may be used. Surlyn® 6320 (a copolymer of ethylene with 23.5% n-butyl acrylate, and about 9% methacrylic acid that is about 50% neutralized with a magnesium cation source); Surlyn® 8150 (a copolymer of ethylene with about 19% methacrylic acid that is about 45% neutralized with a sodium cation source); Surlyn® 8320 (a copolymer of ethylene with 23.5% n-butyl acrylate, and about 9% methacrylic acid that is about 52% neutralized with a sodium cation source); and Surlyn® 9120 (a copolymer of ethylene with about 19% methacrylic acid that is about 36% neutralized with a zinc cation source); and Surlyn® 9320 (a copolymer of ethylene with 23.5% n-butyl acrylate, and about 9% methacrylic acid that is about 41% neutralized with a zinc cation source) also may be used. Primacor® 3150, 3330, 59801, 5986, and 59901 acid copolymers, commercially available from The Dow Chemical Company also may be used.

In another embodiment, a three-layered cover is made, wherein the plasticized thermoplastic non-acid polymer composition of this invention is used to form the inner and intermediate cover; and a 50%/50% by weight blend of Surlyn® 8940/7940 is used to form the outer cover layer. Preferably, the plasticized composition used to form the inner and intermediate cover layers contains about 10% to about 40% ethyl oleate or other suitable plasticizer. Suitable hardness ranges for the cover layers are described below. Methods for measuring the hardness levels of cover layers also are described further below.

The relationship between the various cover layers is important in the construction of the golf ball of this invention. For example, in Embodiment A, the three-layered cover has an outer cover comprising a polyurethane, polyurea, hybrid, blend, or copolymer thereof. Alternatively, the outer cover may comprise a soft ionomer, a thermoplastic polyether block amide, such as Pebax™, available from Arkema, Inc., or thermoplastic polyester elastomer such as Hytrel™, available from DuPont, but it most preferably made of a polyurethane composition. In embodiment A, the intermediate cover layer comprises the plasticized thermoplastic non-acid polymer composition of this invention; and the innermost cover layer comprises either a "hard" acid copolymer ionomer or a polyamide. The hardness of the polyurethane outer layer is no greater than 55 Shore D, more preferably less than or equal to 50 Shore D. The intermediate cover layer has a hardness of 20 to 60 Shore D, and the inner cover layer has a hardness of greater than 60 Shore D. In embodiment A, the hardness of the outer cover layer is less than the hardness of the intermediate cover layer, and the hardness of the intermediate cover layer is less than the hardness of the inner cover layer. In other words, when considering the three cover layers in Embodiment A, the inner cover layer is the hardest cover layer.

In Embodiment B, a three-layered cover having the same three layers (outer, intermediate, and inner) as described in Embodiment A is produced. However, the hardness of the layers in Embodiment B is different than the hardness of the layers in Embodiment A. Particularly, the hardness of the outer cover layer is greater than the hardness of the intermediate cover layer, and the hardness of the outer cover layer and intermediate cover layer is greater than the hardness of the inner cover layer. In other words, when considering the three cover layers in Embodiment B, the outer cover layer is the hardest cover layer. The inner cover layer may comprise the plasticized thermoplastic non-acid polymer composition of this invention; and the outer cover layer may comprise a "hard" acid copolymer ionomer.

In Embodiment C, a three-layered cover (outer, intermediate, and inner) also is produced, but the hardness of the layers in Embodiment C is different than the hardness of the layers in Embodiments A and B. Particularly, the hardness of the intermediate cover layer in Embodiment C is greater than the hardness of the inner and outer cover layers. For example, the hardness of the polyurethane outer cover layer may be no greater than 55 Shore D, more preferably less than or equal to 50 Shore D. The intermediate cover layer may have a hardness greater than 60 Shore D, and the inner cover layer may have a hardness in the range of about 20 to about 60 Shore D. In other words, when considering the three cover layers in Embodiment C, the intermediate cover layer is the hardest cover layer. The inner and/or outer cover layers may comprise the plasticized thermoplastic non-acid polymer composition of this invention; and the intermediate cover layer may comprise a "hard" acid copolymer ionomer.

In Embodiment D, the outer cover layer comprises a "hard" ionomer having a hardness of at least 60 Shore D; and the intermediate and/or inner cover layer comprises a relatively softer plasticized thermoplastic non-acid polymer composition of this invention.

As discussed above, the golf ball of this invention includes a multi-layered cover comprising inner, intermediate, and outer cover layers, wherein at least one of the layers is formed of the non-acid polymer/plasticizer composition. The compositions of the respective cover layers may vary as described in above Table I; and the hardness of the layers also may vary. For example, in a first embodiment, the plasticized thermoplastic composition of this invention is used to form the inner cover layer, and the hardness of the inner cover is less than the hardness of the intermediate and outer cover layers. Meanwhile, the intermediate and outer cover layers may have the same or different hardness levels. So the hardness relationship is: Inner $Cover_{hardness}$<Intermediate $Cover_{hardness}$≤ or ≥Outer $Cover_{hardness}$. In a modified version, the hardness of the inner cover is less than the hardness of the intermediate cover and yet it is greater than the hardness of the outer cover layer.

In a second embodiment, the plasticized thermoplastic composition is used to form the intermediate cover layer, and the hardness of the intermediate cover is less than the hardness of the inner and outer cover layers. Meanwhile, the inner and outer cover layers may have the same or different hardness levels. That is the inner cover layer may have a hardness equal to, or less or greater than the outer cover layer. So the hardness relationship is: Inner $Cover_{hardness}$>Intermediate $Cover_{hardness}$<Outer $Cover_{hardness}$. In a modified version, the hardness of the intermediate cover is less than the hardness of the inner cover and yet it is greater than the hardness of the outer cover layer.

In a third embodiment, the plasticized thermoplastic composition is used to form the inner and intermediate cover layers, and the hardness of the inner and intermediate cover layers is less than the hardness of the outer cover layer. The inner and intermediate cover layers may have the same or different hardness levels. So the hardness relationship is: Inner $Cover_{hardness}$≤ or ≥Intermediate $Cover_{hardness}$<Outer $Cover_{hardness}$.

In a fourth embodiment, the plasticized thermoplastic composition is used to form the outer cover layer, and the hardness of the inner and intermediate cover layers is greater than the hardness of the outer cover layer. The inner and intermediate cover layers may have the same or different hardness levels. So the hardness relationship is: Inner $Cover_{hardness}$≤ or ≥Intermediate $Cover_{hardness}$>Outer $Cover_{hardness}$.

In a fifth embodiment, the plasticized thermoplastic composition is used to form the inner and outer cover layers, and the hardness of the inner and outer covers is less than the hardness of the intermediate cover layer. The inner and outer cover layers may have the same or different hardness levels. So the hardness relationship is: Intermediate $Cover_{hardness}$>Inner $Cover_{hardness}$≤ or ≥Outer $Cover_{hardness}$.

In a sixth embodiment, the plasticized thermoplastic composition is used to form the intermediate and outer cover layers, and the hardness of the intermediate and outer covers is less than the hardness of the inner cover layer. So the hardness relationship is: Inner $Cover_{hardness}$>Intermediate $Cover_{hardness}$≤ or ≥Outer $Cover_{hardness}$.

In a seventh embodiment, the plasticized thermoplastic composition is used to form each of the cover layers and the hardness of the cover layers may be the same or different. So the hardness relationship is: Inner $Cover_{hardness}$≤ or ≥Intermediate $Cover_{hardness}$≤ or ≥Outer $Cover_{hardness}$.

In one version, the inner cover layer hardness is about 15 Shore D or greater, more preferably about 25 Shore D or greater, and most preferably about 35 Shore D or greater. For example, the inner cover layer hardness may be in the range of about 15 to about 60 Shore D, and more preferably about 27 to about 48 Shore D. In another version, the inner cover layer hardness is about 50 Shore D or greater, preferably about 55 Shore D or greater, and most preferably about 60 Shore D or greater. For example, in one version, the inner cover has a Shore D hardness of about 55 to about 90 Shore D, or about 82 to about 99 Shore C. In another embodiment, the inner cover has a Shore D hardness of about 60 to about 78 Shore D, and in yet another version, the inner cover has a Shore D hardness of about 64 to about 72 Shore D. More particularly, in one example, the inner cover has a hardness of about 65 Shore D or greater. The hardness of the inner cover layer is measured per the methods described further below. In addition, the thickness of the inner cover layer is preferably about 0.015 inches to about 0.100 inches, more preferably about 0.020 inches to about 0.080 inches, and most preferably about 0.030 inches to about 0.050 inches. Typically, the thickness of the inner cover is about 0.035 or 0.040 or 0.045 inches.

Turning to the intermediate cover layer, this layer preferably has a hardness of 70 Shore D or less, or 65 Shore D or less, or 60 Shore D or less, or 55 Shore D or less. Preferably, the intermediate cover has a Shore D hardness in the range of about 25 Shore D to about 60 Shore D, more preferably about 38 to about 50 Shore D. In other embodiments, however, the intermediate cover has a hardness of greater than 70 Shore D, for example, 75 Shore D or greater. Also, the thickness of the intermediate cover layer can vary. For example, in one version, the thickness of the intermediate cover layer is preferably about 0.005 inches to about 0.040 inches, more preferably about 0.010 inches to about 0.035 inches, and most preferably about 0.015 inches to 0.030 inches.

Concerning the outer cover layer, this layer may be relatively thin. The outer cover preferably has a thickness within a range having a lower limit of 0.004 or 0.006 or 0.008 and an upper limit of 0.010 or 0.020 or 0.030 or 0.040 inches. Preferably, the thickness of the outer cover is about 0.016 inches or less, more preferably 0.008 inches or less. The outer cover preferably has a material hardness of 80 Shore D or less, or 70 Shore D or less, or 60 Shore D or less, or 55 Shore D or less, or 50 Shore D or less, or 45 Shore D or less. In one example, the outer cover preferably has a Shore D hardness in the range of about 50 to about 80, more preferably about 55 to about 75. In another example, the outer cover preferably has a Shore D hardness in the range of about 10 to about 70, more preferably about 15 to about 60. The hardness of the outer cover layer is measured per the methods described further below.

In one version, the outer cover layer has a hardness (as measured on the ball) in the range of about 55 to about 80 Shore D, or about 82 to about 99 Shore C, and this surface hardness is greater than the surface hardness of any other layer in the golf ball. In one version, the outer surface hardness (as measured on the ball) of the inner cover layer is less than the outer surface hardness of the core, but it is greater than the geometric center hardness (material hardness) of the core. For example, the core may have an outer surface hardness in the range of about 85 to about 95 Shore C and the inner cover layer may have an outer surface hardness in the range of about 50 to about 80 Shore C and the geometric center hardness (material hardness) of the core may be in the range of about 30 to about 70 Shore C.

The hardness of a cover layer may be measured on the surface or midpoint of the given layer in a manner similar to measuring the hardness of a core layer as described further below. For example, the hardness of the inner cover layer may be measured at the surface or midpoint of the layer. A midpoint hardness measurement is preferably made for the inner and intermediate cover layers. The midpoint hardness of a cover layer is taken at a point equidistant from the inner surface and outer surface of the layer to be measured. Once one or more cover or other ball layers surround a layer of interest, the exact midpoint may be difficult to determine, therefore, for the purposes of the present invention, the measurement of "midpoint" hardness of a layer is taken within plus or minus 1 mm of the measured midpoint of the layer. A surface hardness measurement is preferably made for the outer cover layer. In these instances, the hardness is measured on the outer surface (cover) of the ball. Methods for measuring the hardness are described in detail below under "Test Methods."

The compositions used to make any cover layer (for example, inner, intermediate, or outer cover layer) may contain a wide variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The different hardness and thickness levels of the cover layers provide the ball with high impact durability and cut-, shear- and tear-resistance levels. In addition, the multi-layered cover, in combination with the core layer, helps impart high resiliency to the golf balls. Preferably, the golf ball has a Coefficient of Restitution (CoR) of at least 0.750 and more preferably at least 0.800 (as measured per the test methods below.) The core of the golf ball generally has a compression in the range of about 20 to about 130 and more preferably in the range of about 60 to about 110 (as measured per the test methods below.) These properties allow players to generate greater ball velocity off the tee and achieve greater distance with their drives. At the same time, the cover layers provide a player with a more comfortable and natural feeling when striking the ball with a club. The ball is more playable and the ball's flight path can be controlled more easily. Other ball constructions, wherein the ball has a lower compression are described further below.

More particularly, when sample spheres of the plasticized thermoplastic composition of this invention, which can be used to form the inner cover layer, are prepared (1.55" injection-molded spheres aged two weeks at 23° C./50% RH), the samples preferably have a CoR of about 0.400 to about 0.850 and a compression of about negative 250 to about 50. In contrast when the ethylene acid copolymer ionomer blend (50/50 wt. % Surlyn 8940/7940), which can be used to form the outer cover layer, is injection-molded into spheres, the samples preferably have a CoR of about 0.725 to about 0.820 and a compression of about negative 80 to about 180.

Figure 2:
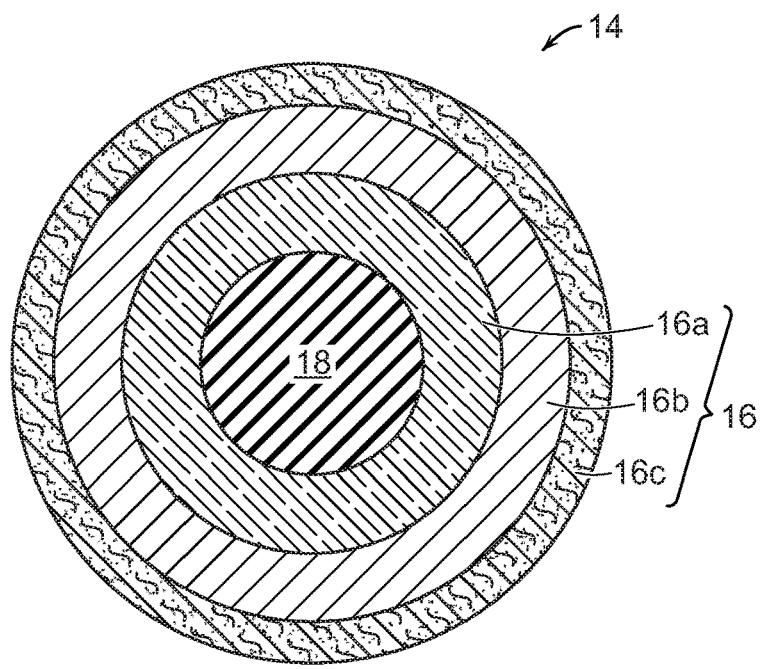
FIG. 2 is a cross-sectional view of a four-piece golf ball having a core and multi-layered cover made in accordance with the present invention.
Figure 3:
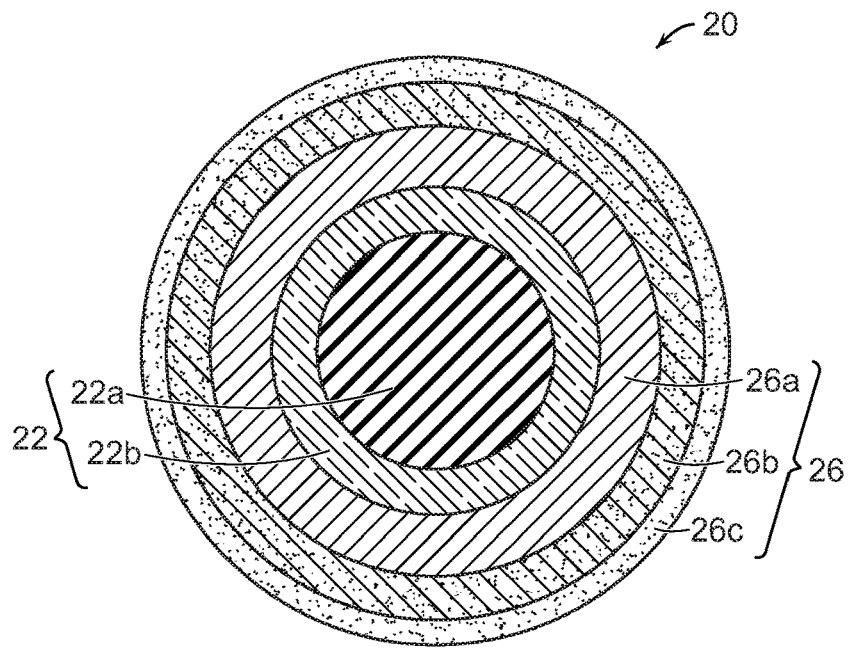
FIG. 3 is a cross-sectional view of a five-piece golf ball having a dual-core and multi-layered cover made in accordance with the present invention.
Figure 4:
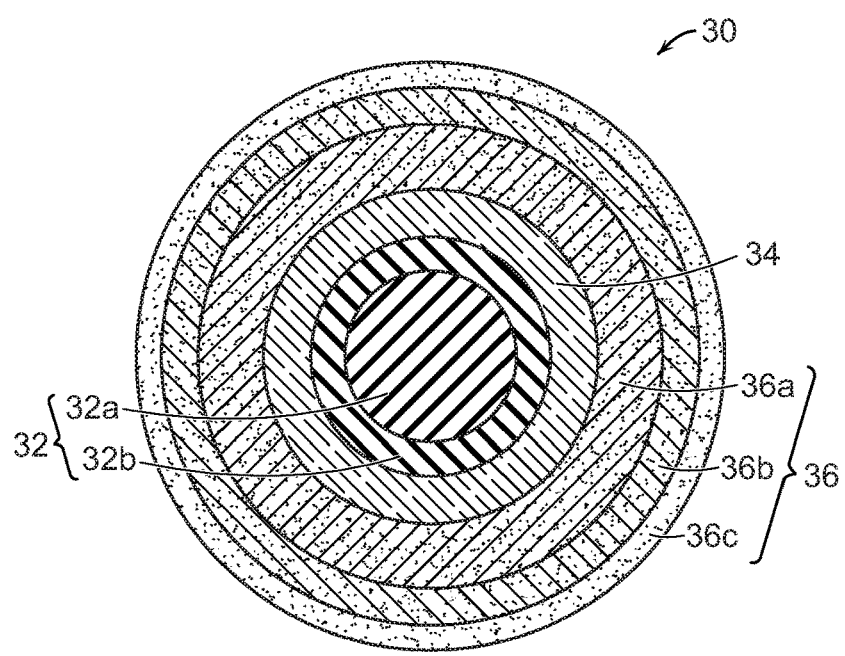
FIG. 4 is a cross-sectional view of a six-piece golf ball having a dual-core; an intermediate layer; and multi-layered cover made in accordance with the present invention.

Referring to FIG. 1, a perspective view of a finished golf ball that can be made in accordance with this invention is generally indicated at (10). The dimples (12) may have various shapes and be arranged in various patterns to modify the aerodynamic properties of the ball. In FIG. 2, a four-piece golf ball (14) with a multi-layered cover (16) comprising inner cover layer (16a), intermediate cover layer (16b), and outer cover layer (16c) is shown. The ball (14) further includes a solid, one-piece core (18). Turning to FIG. 3, the five-piece ball (20) includes a dual-core (22) comprising an inner core (center) (22a) and surrounding outer core layer (22b). The multi-layered cover (26) encapsulates the core structure (22) and includes inner (26a), intermediate (26b), and outer (26c) cover layers. Finally, in FIG. 4, a six-piece ball (30) containing a dual-core (32) comprising inner (32a) and outer core layers (32b) is shown. An intermediate layer (34) is disposed between the core structure (32) and multi-layered cover (36). The intermediate layer (34) also may be referred to as a casing layer. The intermediate layer (34) preferably has good water vapor barrier properties to prevent moisture from penetrating into the core material. The ball may include one or more intermediate layers (34) disposed between the core (32) and cover (36) structures. The multi-layered cover (36) includes inner (36a), intermediate (36b), and outer (36c) cover layers. Preferably, the inner cover and/or intermediate cover is made of the plasticized non-acid polymer composition.

Different ball constructions can be made using the cover assembly of this invention as shown in FIGS. 1-4 discussed above. Such golf ball constructions include, for example, two-piece, three-piece, four-piece, five-piece, and six-piece constructions. It should be understood that the golf balls shown in FIGS. 1-4 are for illustrative purposes only, and they are not meant to be restrictive. Other golf ball constructions can be made in accordance with this invention.

Core Structure

The above-described cover layers are disposed about a core sub-assembly to form the finished golf ball. Single-layer or multi-layer cores may be made. For example, a two-layered core having an inner core (center) and surrounding outer core layer may be made in accordance with this invention. In another example, a three-layered core having an inner core and outer core layer, wherein an intermediate core layer is disposed between the inner and outer core layers may be made. The plasticized thermoplastic compositions, which are described above as being suitable for making cover layers, are also suitable for forming the core layers. Thermoset rubber compositions and non-plasticized thermoplastic compositions also are suitable for making core layers in accordance with this invention. Thermoplastic compositions comprising acid polymers as described above also can be used to form the inner and/or outer core layers.

In one embodiment, the inner core (center) comprises a thermoplastic material, for example, the plasticized thermoplastic non-acid composition of this invention or an acid polymer such as a O/X- and O/X/Y-type acid copolymers, wherein O is an α-olefin, X is a $C_3$-$C_8$ α,β-ethylenically unsaturated carboxylic acid, and Y is a softening monomer. 0 is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl(meth) acrylate.

In another embodiment, the inner core comprises a thermoset material. Suitable thermoset materials that may be used to form the inner core include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof.

The thermoset rubber materials may be cured using a conventional curing process as described further below. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy) 3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber composition also may include filler(s) such as materials selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed.

In addition, the rubber compositions may include antioxidants to prevent the breakdown of the elastomers. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.) Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art may be added to the rubber composition.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh, Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBR 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

As discussed above, in one embodiment, the core has a dual-layered structure. For example, an inner core (center) comprising a thermoplastic ethylene acid copolymer or thermoset rubber composition as described above may be prepared. Meanwhile, the outer core layer, which surrounds the inner core, also may comprise a thermoplastic or thermoset composition. In another embodiment, the core has a three-layered structure comprising an inner core, intermediate core layer, and outer core layer. For example, the core may include an inner core comprising the plasticized thermoplastic composition of this invention; an intermediate core layer comprising a thermoplastic composition; and an outer core layer comprising a thermoset rubber composition.

Hardness of Core

The hardness of the core assembly (inner core and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core assembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C. In a second alternative version, the inner core may have a zero or negative hardness gradient; and the outer core layer may have a positive hardness gradient. Still yet, in another embodiment, both the inner core and outer core layers have zero or negative hardness gradients.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient. For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient. On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient. In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 or 23 or 24 or 28 or 31 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 or 22 or 26 or 30 or 34 or 36 or 38 or 42 or 48 or 50 or 52 Shore D and an upper limit of about 54 or 56 or 58 or 60 or 62 or 70 or 72 or 75 or 78 or 80 or 82 or 84 or 86 or 90 Shore D. In one version, the outer surface hardness of the inner core ($H_{inner\ core\ surface}$), as measured in Shore C units, has a lower limit of about 13 or 15 or 18 or 20 or 22 or 24 or 27 or 28 or 30 or 32 or 34 or 38 or 44 or 47 or 48 Shore C and an upper limit of about 50 or 54 or 56 or 61 or 65 or 66 or 68 or 70 or 73 or 76 or 78 or 80 or 84 or 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

Meanwhile, the intermediate core layer preferably has an outer surface hardness ($H_{outer\ surface\ of\ the\ Inter\ Core}$) of about 30 Shore D or greater, and more preferably within a range having a lower limit of about 30 or 35 or 40 or 42 or 44 or 46 or 48 or 50 or 52 or 54 or 56 or 58 and an upper limit of about 60 or 62 or 64 or 70 or 74 or 78 or 80 or 82 or 85 or 87 or 88 or 90 Shore D. The outer surface hardness of the intermediate core layer ($H_{outer\ surface\ of\ the\ Inter\ Core}$), as measured in Shore C units, preferably has a lower limit of about 30 or 32 or 36 or 40 or 45 or 50 or 55 or 60 or 63 or 65 or 67 or 70 or 73 or 75 or 76 or 78 Shore C, and an upper limit of about 78 or 80 or 85 or 87 or 89 or 90 or 92 or 93 or 95 Shore C. While, the midpoint (or inner surface) hardness of the intermediate core ($H_{midpoint\ of\ the\ Inter\ Core}$) preferably is about 25 Shore D or greater and more preferably is within a range having a lower limit of about 26 or 30 or 34 or 36 or 38 or 42 or 48 of 50 or 52 Shore D and an upper limit of about 54 or 56 or 58 or 60 or 62 Shore D. As measured in Shore C units, the midpoint hardness of the intermediate core ($H_{midpoint\ of\ the\ Inter\ Core}$) preferably has a lower limit of about 35 or 38 or 44 or 52 or 58 or 60 or 70 or 74 Shore C and an upper limit of about 76 or 78 or 80 or 84 or 86 or 88 or 90 or 92 or 96 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 70 or 72 or 73 or 76 Shore C, and an upper limit of about 78 or 80 or 84 or 87 or 88 or 89 or 90 or 92 or 95 Shore C. And, the inner surface of the outer core layer ($H_{inner\ surface\ of\ OC}$) or midpoint hardness of the outer core layer ($H_{midpoint\ of\ OC}$), preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness ($H_{inner\ surface\ of\ OC}$) or midpoint hardness ($H_{midpoint\ of\ OC}$) of the outer core layer, as measured in Shore C units, preferably has a lower limit of about 40 or 42 or 44 or 45 or 47 or 50 or 52 or 54 or 55 or 58 or 60 or 63 or 65 or 67 or 70 or 73 or 75 Shore C, and an upper limit of about 78 or 80 or 85 or 88 or 89 or 90 or 92 or 95 Shore C.

The midpoint of a core or cover layer is taken at a point equidistant from the inner surface and outer surface of the layer to be measured, most typically an outer core layer or inner cover layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

In one embodiment, the outer surface hardness of the outer core layer ($H_{outer\ surface\ of\ OC}$), is less than the outer surface hardness ($H_{inner\ core\ surface}$) or midpoint hardness ($H_{midpoint\ of\ OC}$), of the inner core by at least 3 Shore C units and more preferably by at least 5 Shore C.

In a second embodiment, the outer surface hardness of the outer core layer ($H_{outer\ surface\ of\ OC}$), is greater than the outer surface hardness ($H_{inner\ core\ surface}$) or midpoint hardness ($H_{midpoint\ of\ OC}$), of the inner core by at least 3 Shore C units and more preferably by at least 5 Shore C.

As discussed above, the inner core may be formed from a thermoplastic composition such as ethylene acid copolymer ionomer or a thermoset composition such as polybutadiene rubber. The outer core layer also may be formed from such thermoplastic or thermoset compositions.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. In another embodiment, there is a zero or negative hardness gradient across the core assembly. For example, the center of the core ($H_{inner\ core\ center}$) may have a hardness gradient in the range of 20 to 90 Shore C; and the outer surface of the outer core may have a hardness gradient in the range of 10 to 80 Shore C. The hardness gradient across the core assembly will vary based on several factors including, but not limited to, the dimensions of the inner core, intermediate core, and outer core layers.

The United States Golf Association (USGA) has established a maximum weight of 45.93 g (1.62 ounces) for golf balls. For play outside of USGA rules, the golf balls can be heavier. Thus, in such outside of the USGA cases, the balls can have a weight greater than 1.62 ounces. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of USGA, the golf balls can be of a smaller size. Thus, in such outside of the USGA cases, the balls can have a diameter size of less than 1.68 inches. Normally, golf balls are manufactured in accordance with USGA requirements and have a diameter in the range of about 1.68 to about 1.80 inches. As discussed above, the golf ball contains a cover which may be multi-layered and in addition may contain intermediate layers, and the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core assembly is in the range of about 1.45 to about 1.62 inches.

Manufacturing of Golf Balls

The inner core may be formed by any suitable technique including compression and injection molding methods. The outer core layer, which surrounds the inner core, is formed by molding compositions over the inner core. Compression or injection molding techniques may be used to form the other layers of the core assembly. Then, the cover layers are applied over the core assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball assembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball sub-assembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Other Ball Constructions

It should be understood that the golf ball constructions described above are for illustrative purposes only, and they are not meant to be restrictive. Other golf ball constructions can be made in accordance with this invention.

For example, very low compression golf balls comprising at least one core or cover layer made from the plasticized thermoplastic composition of this invention may be manufactured. The golf ball preferably has a compression of less than 60, more preferably less than 50 and may be within a range of from about negative 60 to positive 55 DCM. More preferably, the DCM range is from about negative 20 to positive 40, and may be from about zero to 35, and may be about 5, 10, 20 or 25, 30, 45 or 50 DCM. The ball can be a one-piece ball comprising a single layer of the plasticized thermoplastic composition, or a two- or more piece ball with one or more layers comprising the plasticized thermoplastic composition (for example, core layer, cover layer, and/or intermediate layer). For example, a very low compression two-piece ball may comprise a core of a thermoset polybutadiene and cover of a plasticized thermoplastic composition. A very low compression three-layer ball may comprise an inner core of a thermoset polybutadiene, an inner cover of a plasticized thermoplastic composition, and an outer cover of an ionomer or polyurethane. A very low compression four-layer golf ball may be constructed with an inner core layer and an outer core layer, both comprising a thermoset polybutadiene, an inner cover layer comprising a plasticized thermoplastic composition, and an outer cover layer comprising an ionomer or polyurethane.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements and is set to record the maximum hardness reading attained for each measurement. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer.

Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core or cover layer is taken at a point equidistant from the inner surface and outer surface of the layer to be measured, for example an outer core layer or inner cover layer. Also, once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. The DCM is an apparatus that applies a load to a core or ball and measures the number of inches the core or ball is deflected at measured loads. A load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

Coefficient of Restitution ("COR"). The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR = V_{out}/V_{in} = T_{in}/T_{out}$).

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A golf ball, comprising:
   i) a core having at least one layer;
   ii) an inner cover layer disposed about the core and having a Shore D midpoint hardness in the range of about 45 to about 75;
   iii) an intermediate cover layer comprising a thermoplastic material, the inner cover layer being disposed about the core and having a Shore D midpoint hardness in the range of about 15 to about 60, the thermoplastic material comprising:
      a) a thermoplastic non-acid polymer; and
      b) a plasticizer, the plasticizer being an alkyl oleate selected from the group consisting of methyl oleate, ethyl oleate, propyl oleate, butyl oleate, and octyl oleate, and mixtures thereof; and
   iv) an outer cover layer disposed about the intermediate cover layer and having a Shore D surface hardness in the range of about 45 to about 75, and wherein the outer cover and inner cover layers each have a hardness greater than the hardness of the intermediate cover layer.

2. The golf ball of claim 1, wherein the non-acid polymer is selected from the group consisting of fluoropolymers, polystyrenes, polyolefins, polyamides, polyesters, polyethers, polyurethanes, polyureas, polyvinyl chlorides, polyvinyl acetates, polyimides, and mixtures thereof.

3. The golf ball of claim 1, wherein the non-acid polymer is a polyamide selected from the group consisting of polyamide 6; polyamide 6,6; polyamide 6,10; polyamide 6,12; polyamide 11; polyamide 12; polyamide 6,9; and polyamide 4,6, and copolymers and blends thereof.

4. The golf ball of claim 1, wherein the non-acid polymer is selected from the group consisting of a polyether-amide block copolymer and a polyester-polyether block copolymer, and mixtures thereof.

5. A golf ball, comprising:
   i) a core having at least one layer;
   ii) an inner cover layer disposed about the core and having a Shore D midpoint hardness in the range of about 45 to about 75;
   iii) an intermediate cover layer disposed about the inner cover layer and having a Shore D midpoint hardness in the range of about 45 to about 75;
   iv) an outer cover layer disposed about the intermediate cover layer and having a Shore D midpoint hardness in the range of about 15 to about 60, the thermoplastic material comprising:
      a) a thermoplastic non-acid polymer; and
      b) a plasticizer, the plasticizer being an alkyl oleate selected from the group consisting of methyl oleate, ethyl oleate, propyl oleate, butyl oleate, and octyl oleate, and mixtures thereof;

wherein the inner and intermediate cover layers each have a hardness greater than the hardness of the outer cover layer.

6. The golf ball of claim 5, wherein the non-acid polymer is selected from the group consisting of fluoropolymers, polystyrenes, polyolefins, polyamides, polyesters, polyethers, polyurethanes, polyureas, polyvinyl chlorides, polyvinyl acetates, polyimides, and mixtures thereof.

7. The golf ball of claim 5, wherein the non-acid polymer is a polyamide selected from the group consisting of polyamide 6; polyamide 6,6; polyamide 6,10; polyamide 6,12; polyamide 11; polyamide 12; polyamide 6,9; and polyamide 4,6, and copolymers and blends thereof.

8. The golf ball of claim 5, wherein the non-acid polymer is selected from the group consisting of a polyether-amide block copolymer and a polyester-polyether block copolymer, and mixtures thereof.

\* \* \* \* \*